B. L. SMITH, E. H. BARRY AND A. H. BOETTCHER.
TARGET FOLLOWING BOMB SIGHT.
APPLICATION FILED MAR. 11, 1918.
1,389,555.
Patented Aug. 30, 1921.
4 SHEETS—SHEET 1.
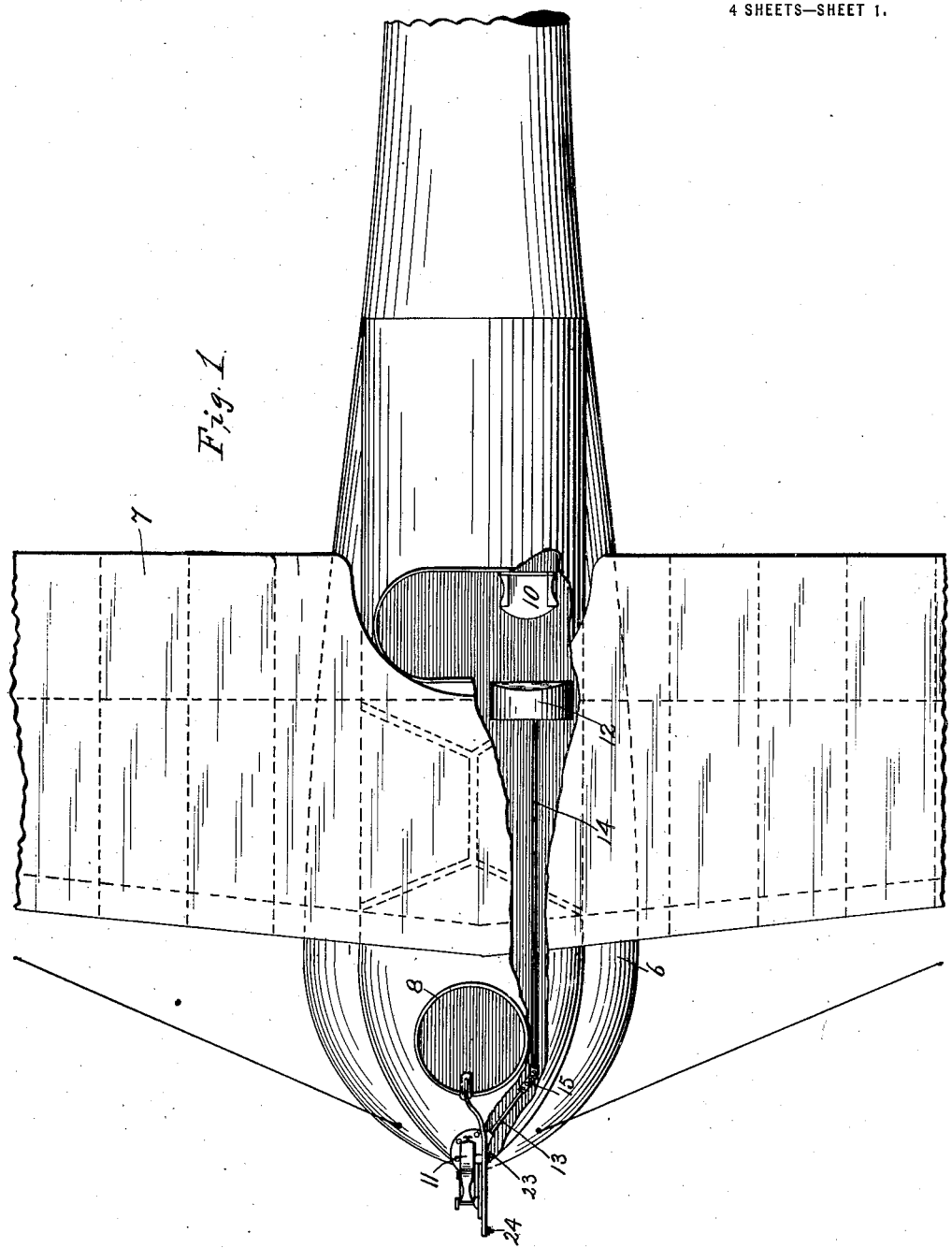
INVENTORS.
Bernard L. Smith
Edward H. Barry
Arthur H. Boettcher

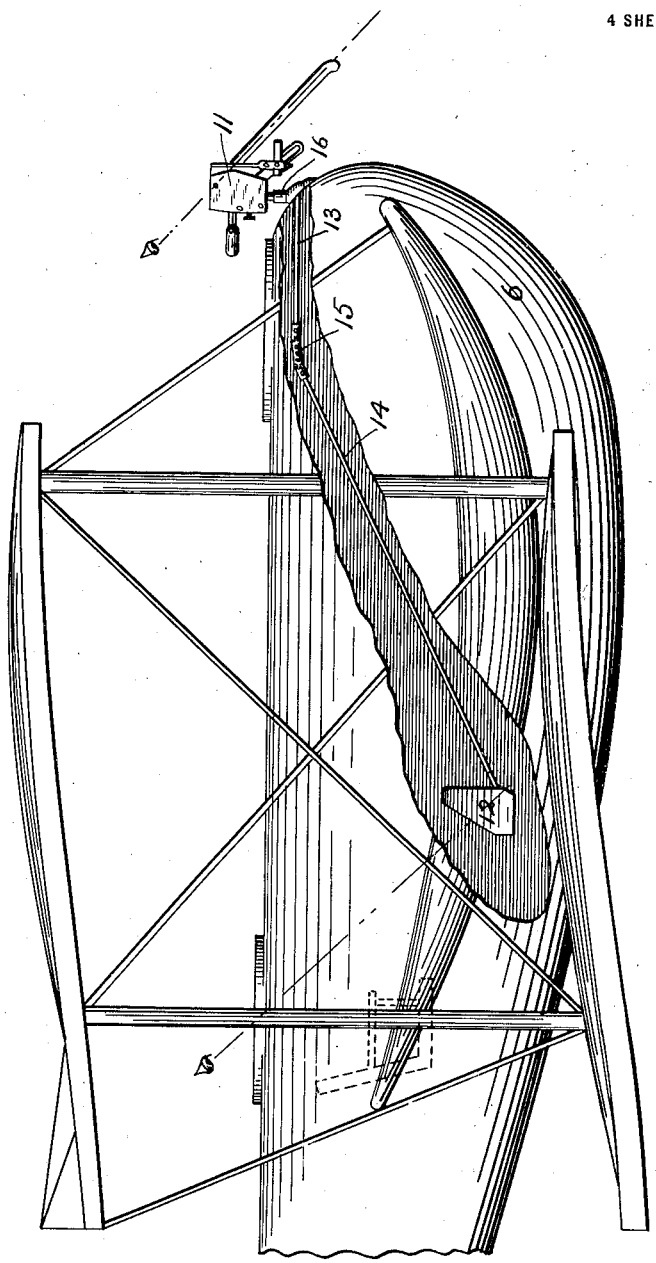

B. L. SMITH, E. H. BARRY AND A. H. BOETTCHER.
TARGET FOLLOWING BOMB SIGHT.
APPLICATION FILED MAR. 11, 1918.
1,389,555.
Patented Aug. 30, 1921.
4 SHEETS—SHEET 3.
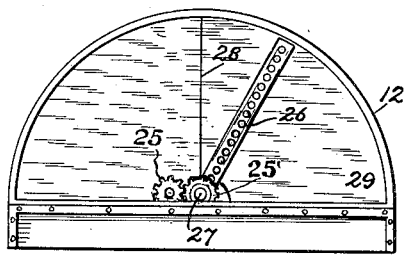
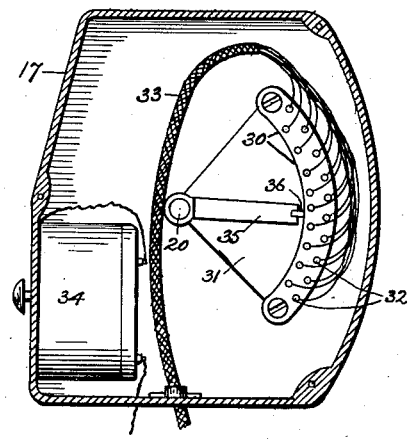
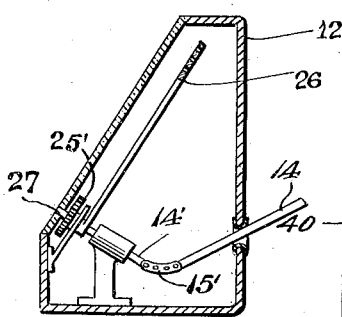
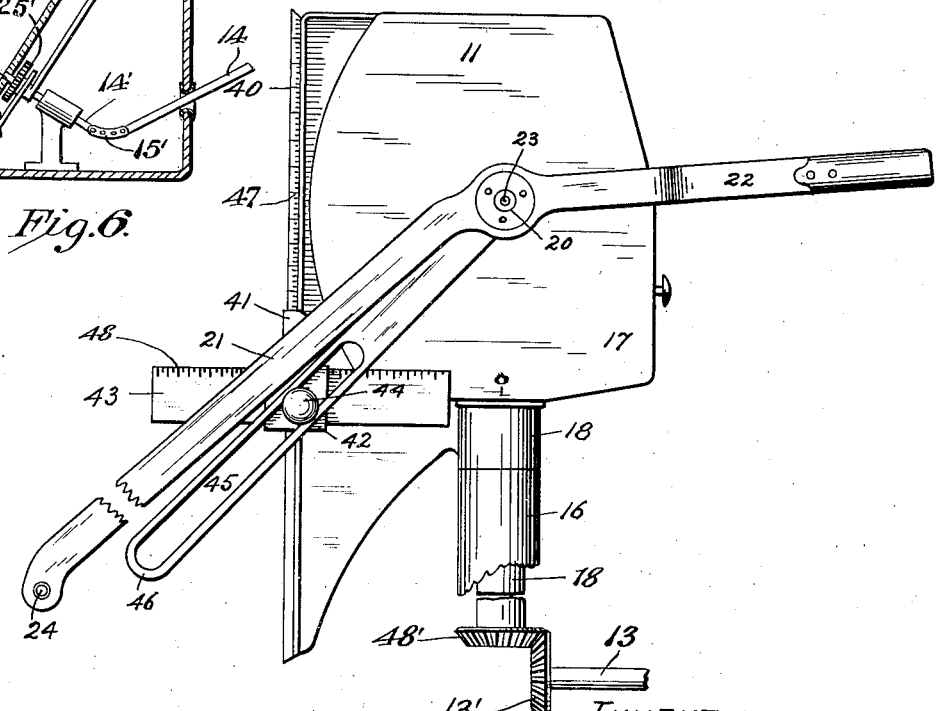
INVENTORS.
Bernard L. Smith
Edward H. Barry
Arthur H. Boettcher

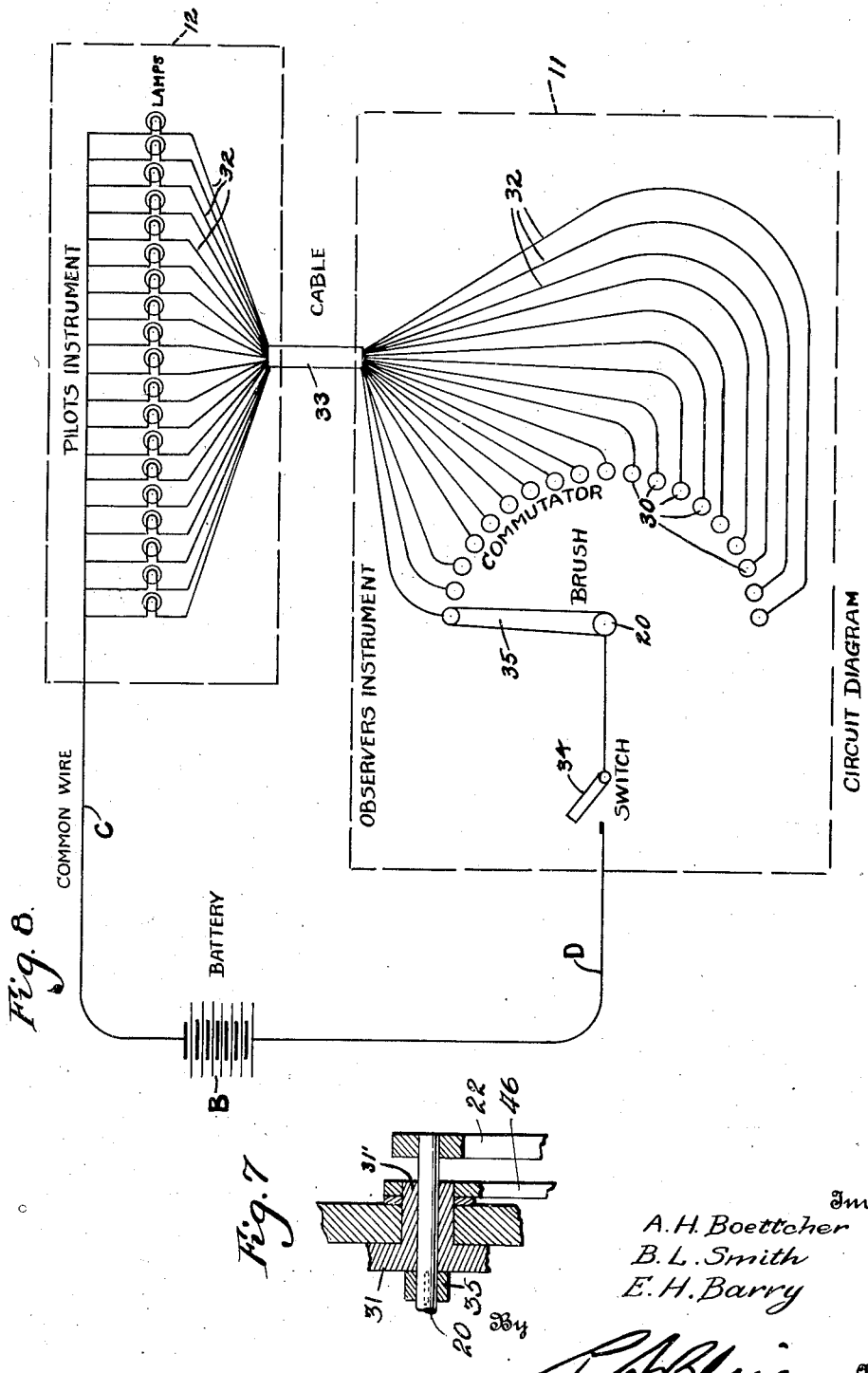

UNITED STATES PATENT OFFICE.

BERNARD L. SMITH, OF WASHINGTON, DISTRICT OF COLUMBIA, EDWARD H. BARRY, OF NEWTON, MASSACHUSETTS, AND ARTHUR H. BOETTCHER, OF CHICAGO, ILLINOIS, ASSIGNORS TO THE GOVERNMENT OF THE UNITED STATES.

TARGET-FOLLOWING BOMB-SIGHT.

1,389,555.           Specification of Letters Patent.     Patented Aug. 30, 1921.

Application filed March 11, 1918. Serial No. 221,838.

*To all whom it may concern:*

Be it known that we, BERNARD L. SMITH, EDWARD H. BARRY, and ARTHUR H. BOETTCHER, citizens of the United States, and residents, respectively, of Washington, District of Columbia, of Newton, State of Massachusetts, and of Chicago, State of Illinois, have invented certain new and useful Improvements in Target-Following Bomb-Sights, of which the following is a specification.

This invention relates to improvements in target following bomb sights, and more particularly to devices adapted to be carried by aircraft for enabling a coöperation between the pilot and the observer, whereby the pilot is facilitated in more accurately positioning the aircraft with respect to the target for insuring a hit when the bomb is dropped.

In aircraft now in use by the Navy Department, carrying both a pilot and observer, the view of the pilot is obstructed or limited by reason of the wings extending laterally from his position in the fuselage of the craft. The positioning of the craft with respect to the target therefore directly depends upon the directions received from the observer who occupies a position at the forward end.

The present invention is therefore directed largely to the provision of a simple and practical means adapted to permit the observer to accurately and quickly transmit signals of direction to the pilot, who thus is enabled to guide the machine to the proper relative location with respect to the target.

A further object is to provide a device of the above general character of relatively simple construction, capable of various adjustments for variations in the speed and altitude with a minimum amount of effort and adapted to operate in an efficient manner under all conditions.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features of the invention that they may embody the same into the numerous modifications in structure and relation contemplated by this invention, drawings depicting a preferred form have been annexed as a part of this disclosure, and in such drawings, like characters of reference denote corresponding parts throughout all the views, of which:—

Figure 1 is a plan view of a portion of a naval airplane showing the apparatus applied thereto.

Fig. 2 is a side elevation of the same.

Fig. 3 is a detail view showing a portion of the sighting device operated by the observer and power transmitting means, in side elevation.

Fig. 4 is the opposite side of the casing 17 with the cover removed.

Fig. 5 is a rear elevation with a portion of the device positioned in front of the pilot.

Fig. 6 is a sectional view through Fig. 5 or Fig. 1.

Fig. 7 is a sectional view on a vertical line passing through the center of shaft 20 in Fig. 4.

Fig. 8 is a diagrammatic view of the wiring connections.

Referring now the drawings in detail, 6 denotes the fuselage of the aircraft provided with laterally extending wings 7, an observer's cockpit 8 in the nose of the machine, and the pilot's cockpit 10 positioned amidships. On the nose of the machine is mounted a sighting device broadly indicated at 11, while directly located in front of the pilot's cockpit is an indicating device or indicator 12. These parts are connected by intervening power transmitting mechanism, including rods 13, 14 and 14', connected by means of double universal joint mechanisms 15 and 15', to accommodate both the lateral and vertical deviations, as will appear clear from an inspection of the Figs. 3 and 6. The double universal connection also overcomes any inaccuracy of transmission.

Now, broadly speaking, these parts are so positioned and arranged that after the observer in the nose of the machine locates the target he thereafter continues to point the sighting device thereon, and the relative position of the sighting device with respect to the longitudinal axis of the machine will be transmitted to the indicating mechanism 11, in front of the pilot, as will also any variation in the relative location of the machine thereafter occurring.

This sighting device 11 includes a standard 16 (Fig. 3) mounted on the longitudinal axis of the machine and at the forward end thereof. At the upper end of the standard is a casing 17 having a swivel shaft 18 whereby the casing 17 may be turned throughout any desired horizontal arc. The shaft 18 carries a bevel gear 18' meshing with bevel gear 13' carried by rod 13. Transversely of the casing 17 is a shaft 20 upon which is mounted a suitable sighting means of any desired type and in the form shown comprises an arm 21 adapted to be actuated by a handle 22. The sighting arm 21 may be either a rod or a tube, preferably however the former, as it permits a more open field of vision. This sighting member 21 may be swung about its horizontal axis 20 and the vertical axis 16, which together constitute a universally movable support permitting the sighting device to be trained in any direction. A pin 24, is disposed at the outer end of arm 21, and a second pin 23, projects from the shaft 20 in alinement with the axis of the shaft, which two pins define the line of sight of the instrument.

Any horizontal lateral movement of this sighting device will be transmitted through the shaft 18, bevel gears 18' and 13', and intervening gearing shafts 14 and 13 to shaft 14 carrying gear 25 meshing with gear 25' (Figs. 5 and 6) to cause the indicating device comprising the arm 26 carrying a bank of lamps, to turn about a center pivot 27, to one side or the other of vertical line 28, on the celluloid or other indicating field 29, according as the sighting device 21 is moved from one side to the other of the normal longitudinal axis of the machine. Any desired form of gearing or power transmitting mechanism may of course be used, but it is preferred to use substantially the embodiment herein shown, comprising the gear connections, in view of its simplicity of construction and the minimum chances of getting out of order. Also, as may readily be seen, the diaphragm 29 is not an essential feature of the device and may be dispensed with if desired.

These lamps or lights are actuated or controlled largely by the mechanism illustrated in Fig. 4, and the wiring connections between the sighting device 11 and indicating device 12 are shown in diagrammatic form in Fig. 8. The casing contains a series of contacts 30 mounted upon a movable commutator segment 31 having a sleeve 31' (Fig. 7) at its center concentric with the shaft 20. Wires 32 are connected each to a contact and are confined to form a cable 33 which leads to the indicating mechanism 12. On one side the lamps are each connected to a wire 32 and on the other side the lamps are each connected to a common wire C leading to one terminal of a battery B. A common wire D is connected to the opposite terminal of the battery B and also to the shaft 20 carrying a contact arm or brush 35 mounted directly upon the shaft 20, and its contact point 36 is adapted to engage successively the various contacts 30 as it is moved up and down on movement of the handle 22, thus completing an electrical circuit between the lamps and the commutator. Within the casing 17, a switch 34 is interposed in the wire D for making and breaking the above referred to electrical circuit. When the switch 34 is closed current from the battery B will flow through wire D, shaft 20, brush 35 and contact 36 to contacts 30. Wires 32 carry the current to the lamps, thence through wire C, back to the battery B. Thus, if the handle 22 is depressed, elevating the sighting arm 21, the contact 36 will engage one of the lower contacts 30 and thereby illuminate one of the lights at the upper part of the indicating member 26. As the sighting arm 21 is depressed, the contact 36 will be moved accordingly to engage the upper contact members 30 successively, thereby illuminating one of the lower lights upon the indicating member 26 until, when in effective sighting position, the lowest light of the series or the so-called "key" light is finally illuminated.

The mechanism above described will give both the azimuth angle, by means of the mechanical gearing, and the angle of elevation by means of the electrical connections. While the azimuth angle will not vary materially with the elevation and speed of the machine to affect the dropping of the bombs, the angle of elevation, however, does vary materially, and for the purpose of overcoming errors which might enter into calculations, the device is provided with both lateral and vertical adjustments.

Referring to Fig. 3, the forward edge of the box 17 is provided with a slide 40 having graduations 47 to indicate altitude in feet. A block 41 having a slide 43 at right angles thereto is mounted on the slide 40 and arranged for vertical movement thereon. The slide 43 carries an auxiliary block 42 mounted for longitudinal movement thereon and having a set screw stop 44, engaging the slot 45 of the member 46 secured to the sleeve 31' mounted upon the shaft 20, which sleeve is connected to the movable commutator segment 31. The slide 43 is provided with graduations 48 to indicate ground speed in knots per hour. These slides are preferably calibrated according to a well-known formula so that they may be set conveniently for various elevations and speeds. It will be seen that as these devices are adjusted the set screw stop 44 will occupy a definite relative position with respect to the casing, and movement of the sight will be transmitted through the sleeve 31' to make a corresponding change in the segment 31 carrying the contacts 30. When the device is set for a certain speed and elevation, the set screw stop occupies a predetermined relation with respect to the sighting member 21, and when the sighting member is brought down into engagement with the set screw, the contact 36 should engage the uppermost contact 30, or so-called "key" contact of the segment 31 thereby to illuminate the lowermost light on the indicating mechanism 26. At this time, pins 23 and 24 and the shaft of set screw stop 44 are in alinement.

The operation of the device is substantially as follows:—As soon as the observer sights a target, he notifies the pilot by a prearranged signal, after which it becomes the duty of the observer to keep the sighting arm 21 always trained upon the target, while the pilot, whose eyes are on the diaphragm 29 of the indicating device 12, where the disposition of the sighting means is symbolized, continues to maneuver his machine until the indicating arm 26, assumes a position coincident with the vertical line 28, when he knows that the target is directly ahead. Depending upon which of the several lights on the bank 26 is lighted he can easily determine how far away the target is in front of the machine. As the machine continues to go forward, the angle of the sighting means 21 more nearly approaches the vertical, and on movement thereof one light after the other in the bank 26 is lighted until when the sighting means is in effective sighting position, the bottom or "key" light is reached, at which instant the pilot knows that the machine is in proper relative position with respect to the target to insure a hit on the dropping of the bomb, provided he is traveling at the predetermined or agreed upon rate of speed and elevation. The bomb, of course, may be dropped by either the pilot or the observer, as both are aware of the moment at which such hit would be made.

It is thus seen that this invention is adapted to accomplish, among others, all of the objects herein set forth in a simple, practical and efficient manner.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

We claim as our invention:

1. In a sighting device for aircraft, in combination, a universally movable sighting means, a member operatively associated with said sighting means and forming one contact point of an electrical circuit, a commutator having contact with said member providing coöperating contact points, an indicating field, signals movable in said field by the movement of said sighting means in one direction and selectively operable by the movement of said sighting means in an intersecting direction.

2. In a sighting device for aircraft, in combination, a movable sighting arm, a commutator member movable with said arm and forming one contact point of an electrical circuit, a commutator segment having contact with said member and providing coöperating contact points, an adjustable stop coöperating with said arm and operatively associated with said commutator segment, indicating means, a series of signaling means associated with said indicating means, said signaling means being connected to said commutator segment and actuated singly on movement of said arm for indicating the disposition of said arm.

3. In a sighting device for aircraft, in combination, universally movable sighting means, a movable arm at a distance therefrom, means for moving said arm by the movement of said sighting means in azimuth, a series of signals carried by said arm, and means for selectively operating said signals by movement of said sighting means in a vertical plane.

4. In a sighting device for aircraft, in combination, universally movable sighting means, an indicating field, and signals movable in said field by the movement of said sighting means in one direction and selectively operable by the movement of said sighting means in an intersecting direction.

5. In a sighting device for aircraft, in combination, universally movable sighting means, an indicating field, and means operable by said sighting means for automatically denoting in said indicating field movement of said sighting means in intersecting directions, said means including an arm movable to give one indication and carrying signals for giving an independent indication.

6. In a sighting device for aircraft, in combination, universally movable sighting means, indicating means including a movable arm automatically operated by movement of said sighting means in one plane, and a series of signaling elements carried by said arm operated singly by the movement of said sighting means in another plane.

7. In a sighting device for aircraft, in combination, universally movable sighting means, an indicating field, a movable arm associated with said field and operatively connected with said sighting means for denoting the disposition of said sighting means with reference to one plane, and a series of signaling means operated singly by the movement of said sighting means for denoting the disposition of said sighting means with reference to another plane.

8. In a sighting device for aircraft, in combination, movable sighting means, an indicator, a movable arm associated with said indicator and actuated by said sighting means for indicating the direction of the line of sight of said sighting means with reference to one plane, and a series of lights carried by said arm operated singly by the movement of said sighting means for indicating the direction of sight of said sighting means with reference to another plane.

9. In a sighting device for aircraft, in combination, universally movable sighting means, indicating means, including a movable member actuated by adjustment of the line of sight in one plane and a series of lights carried by said movable member actuated singly by adjustment of the line of sight in a second plane at right angles to said first named plane.

10. In a sighting device for aircraft, in combination, a movable sighting arm, a contact member actuated by said arm, a movable commutator segment provided with a series of contact points engaged singly by said contact member, and an adjustable stop operatively associated with said commutator segment and engaged by said arm when said contact member is engaging a particular contact point of the series.

11. In a bomb dropping sight for aircraft, in combination, a calibrated slide, a second calibrated slide at an angle to said first slide, a movable commutator element provided with a series of contacts, a movable stop adjustably associated with said slides for regulating the position of said commutator element, a movable sighting arm engaging said stop when in effective sighting position, and a contact member associated and movable with said arm engaging said contacts singly and engaging a particular contact when said arm is in effective sighting position.

12. In a sighting device for aircraft, in combination, universally movable sighting means, an indicating field, signals movable in said field by the movement of said sighting means in one direction and selectively operable by the movement of said sighting means in an intersecting direction and adjustable means for making effective the selective operation of said signals.

13. In combination with an aircraft body having a pilot's position and an observer's position, universally movable sighting means at the observer's position, an indicating field at the pilot's position and means operable by said sighting means for automatically denoting the disposition of said sighting means in said indicating field, said last named means including signals movable in said field by the movement of said sighting means in one direction and selectively operable by the movement of said sighting means in an intersecting direction.

14. In a sighting device for aircraft, in combination, a movable sighting arm, contact means carried thereby forming a contact point in an electrical circuit, an adjustable commutator segment engaged by said means and forming a coöperating contact point in said circuit, said contact means and commutator segment being relatively movable, and a series of lights connected to said commutator segment and adapted to be actuated singly on relative movement of said contact means and commutator segment for denoting the direction of the line of sight of said arm.

15. In a sighting device for aircraft, in combination, a movable sighting arm, contact means carried thereby forming a contact point in an electrical circuit, an adjustable commutator segment engaged by said means and forming a coöperating contact point in said circuit, a stop coöperating with said contact means for limiting the movement thereof and adjustable for speed and elevation of the machine, said contact means and commutator segment being relatively movable, and a series of lights connected to said commutator segment and adapted to be actuated singly on relative movement of said contact means and commutator segment for denoting the direction of the line sight of said arm.

16. In a sighting device for aircraft, in combination, movable sighting means, a stop adjustable for altitude and speed, for defining the effective sighting position of said sighting means, and physical means for transmitting to and indicating at a distant point movement of said sighting member.

17. In a sighting device for aircraft, in combination, universally movable sighting means, a stop adjustable for altitude and speed for defining the effective sighting position of said sighting means, indicating means, and physical means for transmitting to and indicating on said indicating means the direction of motion of said sighting means.

Signed at Washington, D. C., this 9th day of January, 1918.

BERNARD L. SMITH.
EDWARD H. BARRY.
ARTHUR. H. BOETTCHER.